United States Patent
Hamsten et al.

(10) Patent No.: US 11,274,589 B2
(45) Date of Patent: Mar. 15, 2022

(54) METHOD FOR TIMING A REGENERATION PROCESS

(71) Applicant: VOLVO TRUCK CORPORATION, Gothenburg (SE)

(72) Inventors: Andreas Hamsten, Gothenburg (SE); Johan Dahl, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 21 days.

(21) Appl. No.: 14/893,108

(22) PCT Filed: May 27, 2013

(86) PCT No.: PCT/EP2013/001558
§ 371 (c)(1),
(2) Date: Nov. 23, 2015

(87) PCT Pub. No.: WO2014/191008
PCT Pub. Date: Dec. 4, 2014

(65) Prior Publication Data
US 2016/0131011 A1   May 12, 2016

(51) Int. Cl.
*F02D 41/26* (2006.01)
*F01N 11/00* (2006.01)
(Continued)

(52) U.S. Cl.
CPC ............. *F01N 9/002* (2013.01); *F01N 3/023* (2013.01); *F01N 3/206* (2013.01); *F01N 3/2066* (2013.01);
(Continued)

(58) Field of Classification Search
CPC .......... F01N 9/002; F01N 3/023; F01N 3/206; F01N 3/2066; F01N 11/00;
(Continued)

(56) References Cited

U.S. PATENT DOCUMENTS 5,732,551 A    3/1998  Naber et al.
8,359,829 B1 *  1/2013  Ramberg ............ F02D 41/1406
                                                60/274
(Continued)

FOREIGN PATENT DOCUMENTS

CN       103016119 A    4/2013
DE    10 2006 000449 A1    3/2007
(Continued)

OTHER PUBLICATIONS

International Search Report (dated Apr. 8, 2015) for corresponding PCT/EP2013/001558.
(Continued)

*Primary Examiner* — Mathew Franklin Gordon
(74) *Attorney, Agent, or Firm* — Venable LLP; Jeffri A. Kaminski

(57) ABSTRACT

A method for timing of a regeneration process of an exhaust gas system of a vehicle engine includes collecting, during operation of the vehicle, data on an exhaust gas regeneration capability as a function of time, establishing, from the collected data, a statistical probability function for the exhaust gas regeneration capability as a function of time, and identifying, from the probability function, one or several time periods that statistically are suitable and/or unsuitable for carrying out a regeneration process. A method for regeneration of an exhaust gas system of a vehicle engine is also provided.

13 Claims, 2 Drawing Sheets

(51) Int. Cl.
  *F01N 3/023* (2006.01)
  *F01N 9/00* (2006.01)
  *F02D 41/02* (2006.01)
  *F01N 3/20* (2006.01)

(52) U.S. Cl.
  CPC ............ *F01N 11/00* (2013.01); *F02D 41/029* (2013.01); *F02D 41/26* (2013.01); *F01N 2900/0402* (2013.01); *F01N 2900/0421* (2013.01); *F01N 2900/0422* (2013.01); *F01N 2900/08* (2013.01); *F01N 2900/12* (2013.01); *F01N 2900/1404* (2013.01); *Y02T 10/40* (2013.01)

(58) Field of Classification Search
  CPC ......... F01N 2900/0402; F01N 2900/08; F01N 2900/12; F01N 2900/1404; F02D 41/029; F02D 41/26; Y02T 10/47
  See application file for complete search history.

(56) References Cited

U.S. PATENT DOCUMENTS

| | | | | |
|---|---|---|---|---|
| 2002/0052674 A1* | 5/2002 | Chang | ............... | G06F 17/3087 700/300 |
| 2003/0135323 A1* | 7/2003 | Votsmeier | ............ | F02D 41/021 701/115 |
| 2005/0166580 A1 | 8/2005 | Pfaeffle et al. | | |
| 2007/0010933 A1 | 1/2007 | Hochkirchen et al. | | |
| 2009/0308052 A1 | 12/2009 | Zhang et al. | | |
| 2010/0043404 A1 | 2/2010 | Hebbale et al. | | |
| 2010/0109911 A1 | 5/2010 | Vosz | | |
| 2010/0154389 A1* | 6/2010 | Schumacher | ........... | F01N 9/002 60/286 |
| 2010/0319331 A1* | 12/2010 | Wagner | ................ | F01N 3/0238 60/311 |
| 2011/0088374 A1* | 4/2011 | Johnson | ................. | F01N 3/023 60/285 |
| 2011/0126516 A1 | 6/2011 | Gallagher et al. | | |
| 2011/0138775 A1* | 6/2011 | Arrigoni | ................. | F01N 3/027 60/273 |
| 2011/0225949 A1 | 9/2011 | Tewari et al. | | |
| 2012/0060483 A1* | 3/2012 | Renneke | ............... | B60W 10/06 60/295 |
| 2012/0204537 A1* | 8/2012 | Dea | ......................... | F01N 9/002 60/273 |
| 2012/0208672 A1* | 8/2012 | Sujan | .................... | B60W 10/02 477/5 |
| 2013/0074477 A1* | 3/2013 | Kim | ........................ | F01N 3/103 60/274 |
| 2015/0285124 A1* | 10/2015 | Santhanam | ............ | F01N 3/208 60/274 |

FOREIGN PATENT DOCUMENTS

| | | |
|---|---|---|
| DE | 10 2006 021189 A1 | 11/2007 |
| DE | 102005018869 B4 | 2/2009 |
| DE | 10 2008 008566 A1 | 8/2009 |
| EP | 1 195 508 A2 | 4/2002 |
| EP | 1203855 A1 | 5/2002 |
| EP | 1 316 705 A2 | 6/2003 |
| EP | 2 428 669 A2 | 3/2012 |
| GB | 2393404 A | 3/2004 |
| JP | 2004124927 | 4/2004 |

OTHER PUBLICATIONS

Chinese Official Action (dated Aug. 2, 2017) for corresponding Chinese App. 201380076896.5.
Indian Official Action (dated Jun. 13, 2019) for corresponding Indian Application 3599/MUMNP/2015.
Japanese Official Action (dated Mar. 6, 2017) for corresponding Japanese App. 2016-515663.
European Search Report (dated Dec. 22, 2017) for corresponding European App. EP 171 19 1423.

* cited by examiner

METHOD FOR TIMING A REGENERATION PROCESS

BACKGROUND AND SUMMARY

This invention relates to a method for timing of a regeneration process of an exhaust gas system of a vehicle engine. The invention also relates to a method for regeneration of an exhaust gas system of a vehicle engine, Exhaust gas after-treatment systems (EATSs) arranged on trucks and other vehicles normally require intermittent regeneration for removing various substances that accumulate in the system during normal operation of the vehicle and that affect the performance of the engine or the function of the after-treatment system. Examples of exhaust gas after-treatment units that may need regeneration include the following: diesel particulate filter (DPF), diesel oxidation catalyst (DOC), selective catalytic reduction unit (SCR) and urea injection system.

The capability of the exhaust gas to regenerate an exhaust gas after-treatment unit is primarily dependent on the temperature and the mass flow of the exhaust gas. Regeneration is typically performed, by increasing the temperature of the exhaust gas. This way, combustible accumulated substances in a DPF can be burned off. Commonly, the temperature of the gas exhausted by the engine must be kept above a certain threshold temperature during the regeneration process. If the temperature falls below this threshold the regeneration will be aborted and a new regeneration process must be performed. Such interrupted regenerations increase the thermal wear of the after-treatment system and also lead to an increase in fuel consumption since increasing the temperature in the system normally is achieved by burning fuel either less efficiently in the engine and/or by adding it after the engine. Further, in some cases regeneration causes the engine to run a bit different which may be undesired for the driver.

To keep the exhaust gas temperature sufficiently high it is often necessary to operate the engine under increased load, i.e. with increased power, for a period of time. To increase the probability for a successful non-interrupted regeneration it is useful to try to predict when such an engine high-load period is about to take place. Traditionally, the triggers for such periods have been e.g. a minimum vehicle speed and/or a minimum temperature in the after treatment system. However, this does not allow an engine control system to predict the future engine load with any particularly high probability.

More recently it has been proposed to make use of GPS data (US 2012/0216509, US 2012/0167555), route data (U.S. Pat. No. 7,925,431) or different driving cycles (US 2012/0006008) to predict high-load periods suitable for regeneration. However, these methods are not fully satisfying if the route is not set or can be accurately predicted, or if a proper current/future driving cycle is difficult to identify or select.

It is therefore a need for improvements in this field.

The invention concerns, according to an aspect thereof, a method for timing a regeneration process of an exhaust gas system of a vehicle engine.

An aspect of the invention is characterized in that it comprises the steps of:
collecting, during operation of the vehicle, data on an exhaust gas regeneration capability as a function of time,
establishing, from the collected data, a statistical probability function for the exhaust gas regeneration capability as a function of time, and
identifying, from said probability function, one or several time periods that statistically are suitable and/or unsuitable for carrying out a regeneration process.

Most vehicles, in particular commercial vehicles, are operated in a manner that provides data on the exhaust gas regeneration capability (exhaust gas temperature and mass flow, engine power, engine load, etc.) that, if collected, are statistically useful. For instance, a certain vehicle may usually be started at a certain point of time of each working day, it may usually be run at a certain speed for a certain time period towards a working area, it may usually be operated at a high load for a certain time period, the driver may usually break for lunch and turn off the engine at a certain time of day, etc. By collecting such data and establishing a probability function for the exhaust gas regeneration capability as a function of time it is possible to identify time periods that, statistically, are suitable and/or unsuitable for carrying out a regeneration process. What is suitable or not depends on the application but, typically, a time period suitable for regeneration is where one can expect a sufficiently high exhaust gas regeneration capability to be maintained for a sufficiently long time so that the regeneration process (probably) can be completed.

By identifying such (un)suitable time periods it becomes possible to improve the timing of the regeneration process, i.e. it becomes possible to determine in a better way when to start the regeneration. This increases the rate of success of the regeneration because it becomes possible to avoid initializing/starting a regeneration process just before a time period that, statistically, is unsuitable for regeneration, e.g. just before lunch time, and instead take the opportunity to initialize a regeneration process in the beginning of a time period that, statistically, is suitable for regeneration, even if the need for regeneration is not at its most critical level.

The inventive method thus provides a statistical prediction of time periods that are suitable and/or unsuitable for regeneration and by adapting the timing (the start) of the regeneration process as described above the rate of success of the regeneration can be increased. In turn, this means that the number of interrupted regenerations will decrease which reduces the thermal wear of the after-treatment system and prevents an unnecessary increase in fuel consumption. This is of particular importance for regeneration of units positioned further downstream than other units in the exhaust gas flow, e.g. SCR, since regeneration of such downstream units takes a longer time, perhaps around an hour.

It may be that the statistical data show that there is no time period suitable for regeneration. This could, for instance, be the case for a garbage truck that makes a lot of stops. In such a case support is provided for carrying out a stand-still/parked regeneration. That is, the statistical data imply that there is no particular point in trying to regenerate during (normal) operation of the vehicle.

Once a regeneration process has been started it may be controlled in a conventional way, i.e. it may be interrupted if, for instance, the temperature of the exhaust gas falls below a certain threshold. A specific regeneration process may thus be interrupted even if started in the beginning of a "suitable" time period. However, on the average, the number of interrupted regenerations will decrease if the timing of the regeneration is adapted to the expected suitable and unsuitable time periods for carrying out the regeneration.

It should be noted that the statistical data is only one parameter out of several for deciding whether to start regeneration or not. Other parameters are e.g. whether the exhaust gas temperature is sufficient in the particular situation, whether all parts and units are functioning as intended and, of course, the need for carrying out regeneration.

The exhaust gas regeneration capability may be expressed and measured in different ways. A quantity or property that is related to the exhaust gas regeneration capability, such as engine power, engine load, engine torque, exhaust gas temperature and exhaust gas power, may be measured and/or used in the statistical probability function, separately or in combination, as a representation of the exhaust gas regeneration capability. These alternative quantities or properties may be denoted exhaust gas regeneration capability equivalents.

The step of collecting data on exhaust gas regeneration capability as a function of time during operation of the vehicle means that the exhaust gas regeneration capability (or another quantity representing the exhaust gas regeneration capability) is determined during a certain point or short interval in time, wherein the two values (exhaust gas regeneration capability and time) are collected. Such values may be obtainable from equipment already provided on modern vehicle, such as an engine control unit. The data may be stored on-board during operation of the vehicle or sent wireless to another unit/computer.

In practice one may store a representation of the exhaust gas regeneration capability in a one-dimensional map where one axis represents time since start. What is actually stored can be, for instance, the average engine power during the latest time basis, e.g. 15 minutes. As an alternative it is possible to store e.g. the average exhaust gas temperature incoming to the EATS. The average can be calculated using a moving time window that has a length corresponding to the time basis. Several alternatives are possible.

The statistical probability function can be established in various ways. A main purpose is to sort and handle the collected data in such a way that any statistical trends can be extracted. To visualize an example of a statistical probability function one may group all data in time bins of a certain width, e.g. in 20-min bins, and calculate the average or most probable exhaust gas regeneration capability in each bin. A plot of these data shows how the exhaust gas regeneration capability varies with time, e.g. over one working day of the vehicle. By adding data from further working days to the same plot statistical trends may develop. It is, however, not necessary to visualize the statistical probability function; properly programmed computers can perform this step without explicitly visualize the data. How to treat data statistically by using computers is well known as such.

From the stored map containing engine power, exhaust gas temperature or other representation of the exhaust gas regeneration capability, it is possible to calculate the probability for a successful regeneration. No further map is required for this. This probability, together with the particular vehicle condition, determines whether a regeneration process should be started. The vehicle condition is a function of e.g.: vehicle speed, exhaust gas temperature at EATS inlet, ambient temperature, and the need for regeneration.

In an example of the statistical probability function the probability for a successful regeneration is given as a function of time (based on the exhaust gas regeneration capability as a function of time).

The system for controlling the regeneration is preferably designed so that a regeneration process can be started if the need for regeneration is large even if the predicted success rate is low. This is for the purpose of avoiding a requirement for stand-still/parked regeneration which is to be avoided in some applications, for instance for city buses. On the other hand, for heavy-duty vehicles (construction equipment) it may be preferable to make use of planned stand-still/parked regeneration.

As to the step of identifying the time periods that statistically are suitable and/or unsuitable for carrying out a regeneration process, this can be done manually from a visualized statistical probability function. However, also this step is preferably performed by a computer where input has been set on e.g. probability for certain range or minimum level of engine power and minimum total time with certain exhaust gas regeneration capability.

The regeneration process typically refers to regeneration of a DPF (regeneration of soot), of an SCR-unit (of sulphur and other contaminants), of a DOC (of hydrocarbons and sulphur), and/or of a urea injection system (of urea crystals or polymers).

In an embodiment of the invention the method comprises the step of identifying one or several time periods that statistically are suitable and/or unsuitable for initializing the regeneration process.

A time period suitable for initializing, i.e. starting, the regeneration process is most likely found in connection to a time period suitable for carrying out the regeneration, and in particular in the beginning thereof. For instance, if it has been identified that between 9 am and 10 am the engine usually operates with a high load generating high temperature exhaust gas, i.e. it has been identified that this period of time is suitable for carrying out the regeneration, the time period suitable for initializing the regeneration process is 9 to 9:30 am for a regeneration process that normally takes around 25 minutes to complete.

The time required for regeneration of an EATS unit placed downstream of another EATS unit, such as an SCR-unit placed downstream of a DPF, is longer because of the thermal mass of the upstream unit. As to an SCR-unit, the regeneration process takes longer time compared to that of a DPF because the thermal mass of the SCR-unit is normally larger than that of the DPF.

A time period unsuitable for initializing the regeneration process is just before the engine is turned off or operates at a low power, such as just before a break or the end of the working day.

In an embodiment of the invention the statistical probability function is related to a cyclic 24-hours time period such that the identified time period(s) correspond(s) to time period(s) between certain recurrent points of time.

This way data from a plurality of workdays can be added to each other such as to build up a probability function of the exhaust gas regeneration capability (exhaust gas temperature, engine power or equivalent) for a certain time of day. Although other cyclic time periods may be used the 24-hours period appears to make most sense.

In an embodiment of the invention the method comprises the step of classifying an operational working condition of the vehicle, wherein the steps of collecting exhaust gas regeneration capability data, establishing the statistical probability function and identifying the time period(s) are not related only to the particular vehicle but also to a selected classification of the operational working condition.

If the vehicle is used for a particular operation a certain day, an operation that brings about an exhaust gas regeneration capability time distribution that differs considerably from what is normal, the data from this day is classified as a differing operational working condition and are not included in the identification of time periods suitable for regeneration during normal working days.

In an embodiment of the invention the classification of the operational working condition comprises a selection of at least one particular weekday.

If the vehicle is used for certain tasks on e.g. Tuesdays, the data from Tuesdays are thus excluded from the identification of suitable time periods for regeneration for the other weekdays. Similarly, only Tuesday-data are used for identifying suitable regeneration time periods for Tuesdays.

In general, only reasonably fresh data should be used for identifying suitable or unsuitable time periods for carrying out the regeneration process. For instance, if the vehicle is used for other purposes that generate differing data for the variation of the exhaust gas regeneration capability, the old data from the previous use are not used for the timing of the regeneration.

In an embodiment of the invention the method comprises the step of identifying a driver of the vehicle, wherein the steps of collecting exhaust gas regeneration capability data, establishing the statistical probability function and identifying the time period(s) suitable for regeneration are not related only to the particular vehicle but also to a particular driver of the vehicle.

This way it is possible to adapt the regeneration time periods to different drivers who, for instance, may have lunch at different times or may run the vehicle in different ways.

The invention also concerns a method for regeneration of an exhaust gas system of a vehicle engine comprising the steps of:
    providing a time period that statistically is suitable for initializing a regeneration process, said time period being obtained by
    collecting, during operation of a first vehicle, data on an exhaust gas regeneration capability as a function of time,
    establishing, from the collected data, a statistical probability function for the exhaust gas regeneration capability as a function of time, and
    identifying, from said probability function the time period that statistically is suitable for initializing the regeneration process; and
    initializing a regeneration process during said time period of an exhaust gas system of a second vehicle.

This way the regeneration is started during a period that makes the probability of completing the regeneration higher than if no suitable time period for starting the process had been identified and used. It is not necessary that the regeneration is carried out on the same vehicle as used for identifying the suitable initialization time period, i.e. the first vehicle can be another vehicle than the second vehicle. If several vehicles are operated in a similar way, e.g. simultaneously or where one vehicle replaces another, the identified suitable time period(s) for one vehicle can be used for timing of the regeneration starting point of another vehicle. Of course, the first and second vehicle can be the same.

Whether the regeneration process actually should be started depends of course also on the vehicle conditions as described above (actual speed, exhaust gas temperature, etc.).

The invention also concerns a method for timing of a regeneration process of an exhaust gas system of a vehicle engine, wherein the method comprises the steps of:
    determining how much time that remains before a driver of the vehicle must take a statutory break according to relevant law, and
    preventing start of the regeneration process if the remaining time is considered not to be sufficient for completing the regeneration process.

Most countries have laws that regulate for how long a driver of a commercial vehicle is allowed to work before he/she must take a break. Typically, a driver may work for a couple of hours without break. Commonly, the vehicle is turned off or is allowed to operate only at a low load during such a break which means that if a regeneration process has been started when it is time for break it will be interrupted. By determining how much time that remains until such a break is expected to be taken, it becomes possible to avoid starting a regeneration process too close before the expected break. This will increase the overall success rate of the regeneration.

The remaining time is obtained by subtracting the driver's working time since the latest break (or since start of the working day) from the maximum time period without break stipulated in the relevant law. To determine for how long the driver has been in current work it is possible to let the driver trig some sort of signal, but to make the process automatic the determination of the remaining time is preferably achieved by determining for how long the vehicle has been in current operation. Data on engine load, exhaust gas temperature etc, i.e. similar data as discussed in connection to the exhaust gas regeneration capability above, can be used to determine the time period during which the vehicle has been in current operation. Such data can be stored on an on-board control unit in line with what is described above.

The term "current operation" refers to a more or less continuous operation without any longer breaks. A control system used to determine the total time of the current operation may be adapted to neglect a few short stops of the vehicle engine.

The time needed for completing the regeneration process depends, for instance, on the type of EATS unit to be regenerated. Whether the remaining time, i.e. the available time, for carrying out the regeneration is considered to be sufficient for completing the regeneration thus depends, for instance, on what type of unit that is to be regenerated. A safety margin for the time required is preferably considered when deciding whether to prevent starting of the regeneration process.

The inventive method for timing of the regeneration process thus concerns when to, and when not to, start the regeneration of the exhaust gas system of the vehicle engine.

The invention also concerns a computer program, a computer program product and a computer system for performing the above methods.

BRIEF DESCRIPTION OF DRAWINGS

In the description of the invention given below reference is made to the following figure, in which.

DETAILED DESCRIPTION

Figure 1:
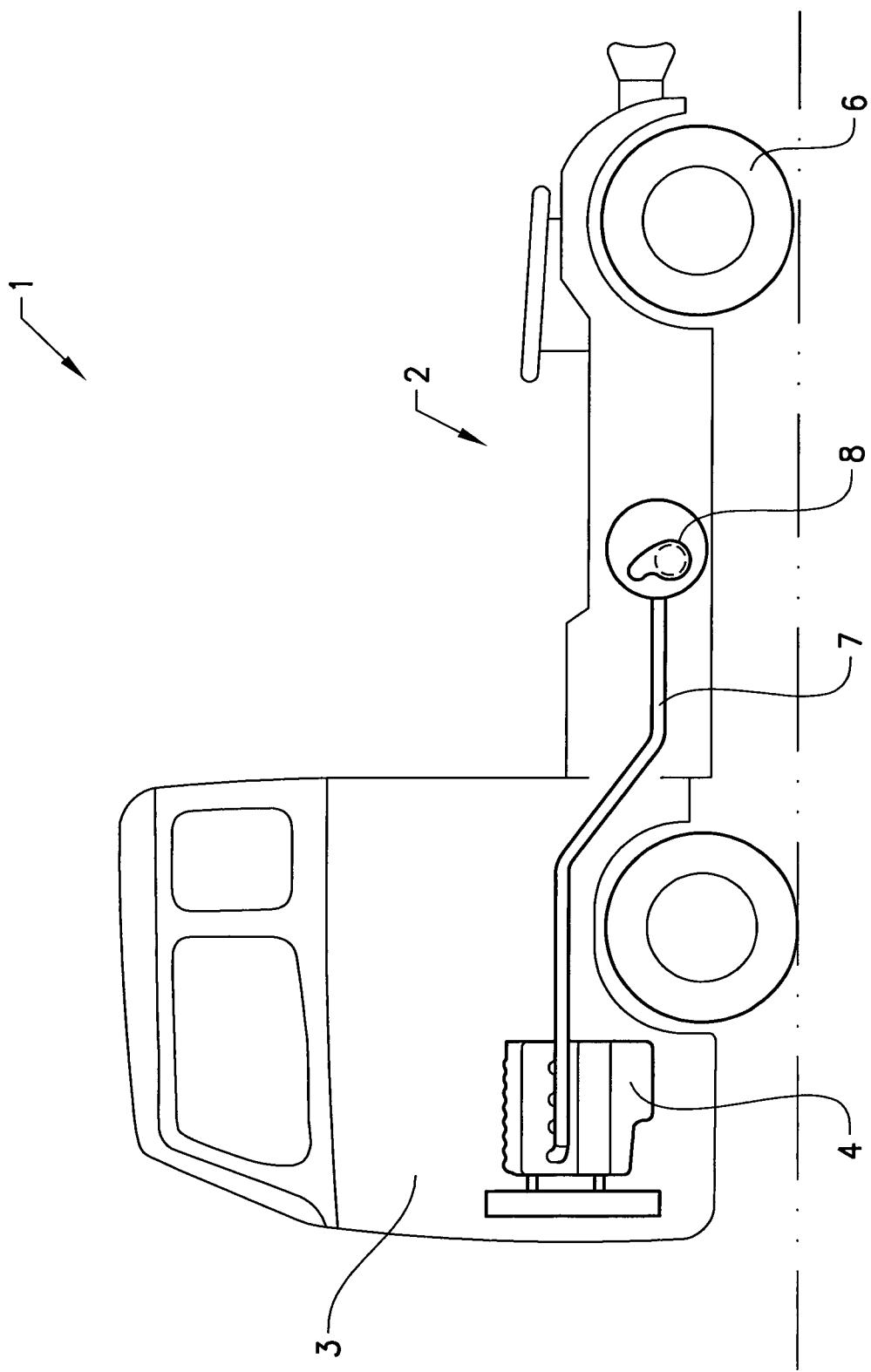
FIG. 1 shows, in a schematic view, a vehicle with an engine and an exhaust gas system to which the invention can be applied.

FIG. 1 shows a commercial vehicle 1 in the form of a tractor unit. The commercial vehicle 1 comprises a chassis 2 and a driver's cab 3 mounted on the chassis. Underneath the driver's cab 3 is an internal combustion engine 4, which acts on the drive wheels 6 of the commercial vehicle 1 by way of a drive train comprising a clutch and a manual transmission or an automatic transmission. The internal combustion engine 4 comprises an exhaust gas system 7 with a first muffler 8 provided with an exhaust after-treatment system (EATS) including, for instance, a diesel particulate filter (DPF) connected to a tailpipe (not shown) which expels the exhaust gases to the atmosphere.

As an example, the inventive method is applicable to a vehicle of the type shown in FIG. 1 for carrying out regeneration of the DPF.

Figure 2:
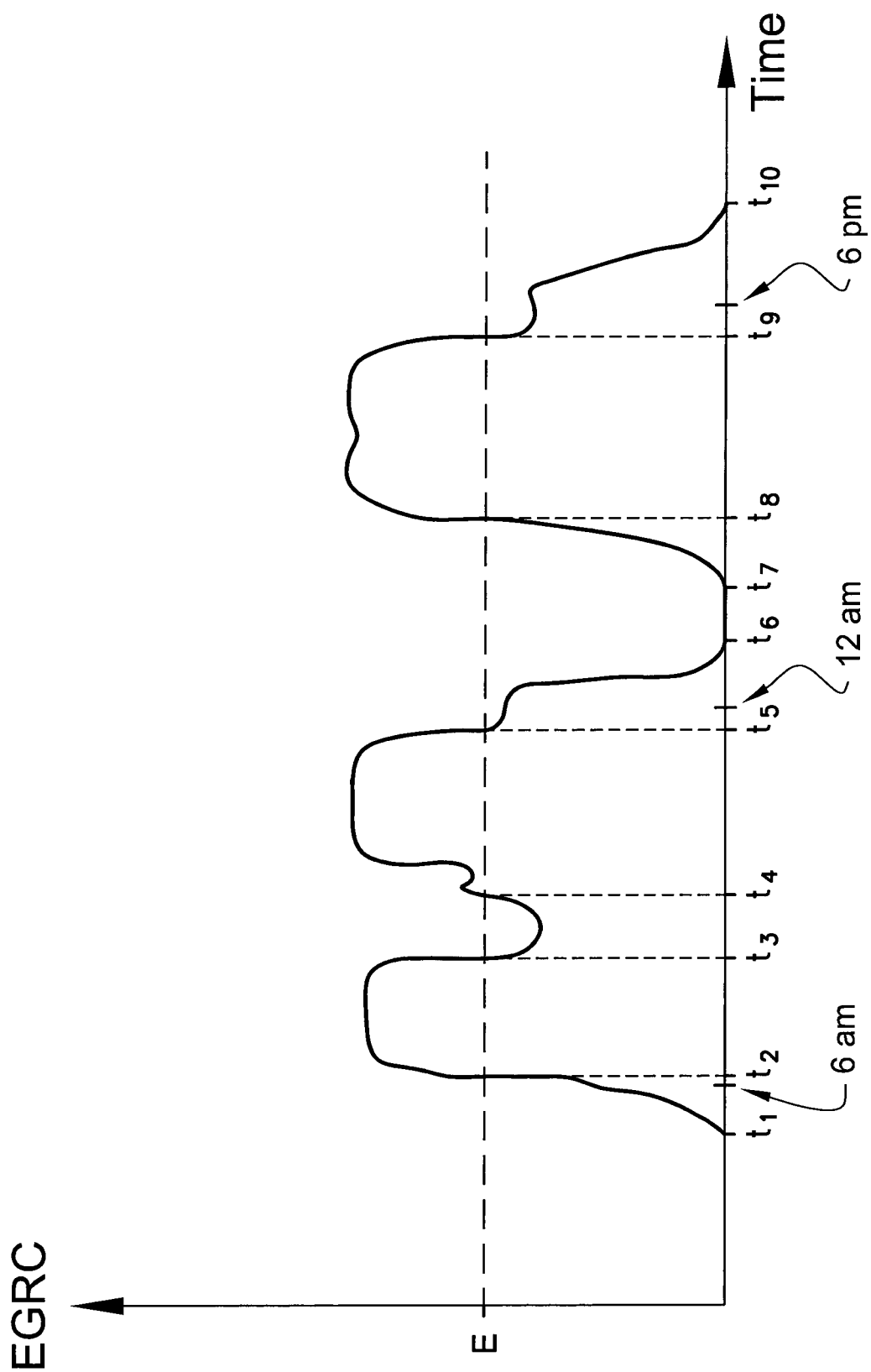
FIG. 2 shows, in a schematic view, an example of a visualized statistical probability function according to the invention.

FIG. 2 shows, in a schematic view, an example of a visualized statistical probability function according to the invention. Time, as a portion of a 24-hours time period, is given on the X-axis and an expected exhaust gas regeneration capability, EGRC (based on measurements of e.g. exhaust gas temperature and/or engine power), is given on the Y-axis in relative terms.

The data in FIG. 2 are based on a collection of data on exhaust gas regeneration capability (e.g. temperature or power) as a function of time during operation of a vehicle, such as the vehicle 1 shown in FIG. 1. Data have been collected for many vehicle working days so that statistical trends can be identified.

The exhaust gas regeneration capability has been determined continuously during a short time interval during all of these working days and the engine power as well as the mean point in time of this interval has been stored.

All data pairs, exhaust gas regeneration capability and point in time, has been grouped together in time bins with a certain width that cover several data points from the same day. For each time bin the most probable exhaust gas regeneration capability has been calculated. A plot of this most probable exhaust gas regeneration capability (in relative terms) versus the position of the corresponding time bin on the time scale of the X-axis results in a curve as exemplified in FIG. 2.

A threshold exhaust gas regeneration capability E is indicated by a dashed line that extends parallel to the X-axis. The threshold exhaust gas regeneration capability, E, indicates a minimum exhaust gas regeneration capability desired for regenerating the exhaust gas system of the vehicle engine, e.g. the DPF described in relation to FIG. 1.

As shown in FIG. 2, the vehicle is usually started at t1 (around 5 am) and turned off for the day at tio (around 7 pm). During the time intervals t2-t3, t4-t5 and t8-t9 the exhaust gas regeneration capability is, statistically, above the threshold. Since these time periods in addition are relatively long, more than an hour each, these time periods are clearly suitable for carrying out a regeneration process.

The driver of the vehicle turns off the vehicle for lunch between t6 and t7 which makes this time period clearly unsuitable for carrying out a regeneration process. Also parts of the time periods t1-t2, t5-t6, t7-t8 and t9-t10 are clearly unsuitable for carrying out a regeneration process. The time period $t_3$-t4 may be suitable for regeneration although the exhaust gas regeneration capability is likely to be below the desired level. It may still be above a critical level.

From FIG. 2 it can thus be identified at least three time periods (t2-t3, t4-t5 and t8-t9) that statistically are suitable for carrying out a regeneration process and three time periods (t1-t2, t5-t8 and t9-t10) that at least partly are unsuitable for carrying out a regeneration process.

Time periods that are suitable for initializing (starting) the regeneration process are the beginning and perhaps also the mid part of the periods t2-t3, t4-t5 and t8-t10. Also the end portion of the time periods t1-t2, t3-t4 and t7-t8 may be regarded to be included in the time periods suitable for initializing the regeneration process.

The data forming the basis of FIG. 2 can alternatively, or as a complement, be used to instead form a statistical probability function where the probability for a successful regeneration is given as a function of time. The peaks of a curve showing the probability for a successful regeneration would have its peaks during time periods that are suitable for initializing (starting) the regeneration process as described above, i.e. in the beginning and perhaps also the mid part of the periods T2-t3, s and t8-t9, and possibly also in the end portion of the time periods t1-t2, t3-t4 and t7-t8. One or several threshold values for the probability for a successful regeneration may be set and used as a parameter for the control unit that is to decide whether regeneration should be started.

Since a function as the one shown in FIG. 2 only shows the expected exhaust gas regeneration capability, in this example the most probable value, an individual regeneration process started in the beginning of e.g. the period t2-t3 may have to be interrupted because the engine power happens to deviate considerably from the expected value on that particular occasion. But the success rate of a particular regeneration process is considerably increased if it is initialized during a time period that statistically is suitable for initialization.

What may be even more important than to start a regeneration process at a statistically optimal moment is to avoid starting the regeneration at a moment where the probability for success is low or very low.

The invention thus improves the active regeneration success rate which saves fuel and reduces thermal aging. By collecting and storing exhaust gas and/or engine data (temperature, power etc.) continuously over time with a time resolution it is possible to make a better prediction of when it is the optimal time to start regeneration (or to avoid starting regeneration). By analysing the engine operating pattern over time every (working) day one would most likely for some vehicles find a period of the day when the engine runs under high load for a prolonged period of time (high exhaust gas regeneration capability), at least for trucks and other vehicles operating in some form of repetitive cycle, and one would also find periods of low power (low exhaust gas regeneration capability).

If the EATS system is in need of active regeneration then the invention can be used to avoid starting any active regeneration if the expected exhaust gas regeneration capability at this time of the day is not sufficient high. Instead one can wait until the expected exhaust gas regeneration capability will be sufficient high. If the regeneration need is severe a regeneration process can of course be started anyway, even though the success rate is low. But the invention makes it possible to avoid starting regenerations when there is an immediate risk of, for instance, a low engine power period.

The invention is not limited by the embodiments described above but can be modified in various ways within the scope of the claims.

The invention claimed is:

1. Method for timing of a regeneration process of an exhaust gas system of a vehicle engine, comprising:
   collecting in a computer, during operation of the vehicle, data on an exhaust gas regeneration capability as a function of time for a plurality of work days, wherein the exhaust gas regeneration capability is determined from at least one of the following: exhaust gas temperature, exhaust gas mass flow, engine power, engine load, and engine torque, establishing, via the computer, from the collected data, a statistical probability function for the exhaust gas regeneration capability as a function of time over a working day of the vehicle by adding data from the plurality of work days to each other, wherein the statistical probability function comprises at least one of an average or a most probable exhaust gas regeneration capability for each one of a group of time bins with a width that covers several data points from the same day, and a statistical probability function where the probability for a successful regeneration is given as a function of time, identifying, via the computer, from the probability function, one or several time periods that statistically are suitable and/or unsuitable for carrying out a regeneration process, wherein a time period that is statically suitable is one during which a sufficiently high exhaust gas regeneration capability is maintained for a sufficient time that it is probable that a regeneration will be completed, and initiating the regeneration process during a time period identified as being statistically suitable for carrying out the regeneration process.

2. Method according to claim 1, further comprising identifying, via the computer, one or several time periods that statistically are suitable and/or unsuitable for initializing the regeneration process.

3. Method according to claim 1, wherein the statistical probability function is related to a cyclic 24-hours time period such that the identified time period(s) correspond(s) to time period(s) between certain recurrent points of time.

4. Method according to claim 1, wherein the method comprises the step of classifying an operational working condition of the vehicle, wherein the steps of collecting exhaust gas regeneration capability data, establishing the statistical probability function and identifying the time period(s) are not related only to the particular vehicle but also to a selected classification of the operational working condition.

5. Method according to claim 4, wherein the classification of the operational working condition comprises a selection of at least one particular weekday.

6. Method according to claim 1, wherein the method comprises the step of identifying a driver of the vehicle, wherein the steps of collecting exhaust gas regeneration capability data, establishing the statistical probability function and identifying the time period(s) suitable for regeneration are not related only to the particular vehicle but also to a particular driver of the vehicle.

7. Method for regeneration of an exhaust gas system of a vehicle engine, comprising:
providing a time period that statistically is suitable for initializing a regeneration process, the time period being obtained by
collecting, in a computer, during operation of a first vehicle, data on an exhaust gas regeneration capability as a function of time for a plurality of work days,
establishing, via the computer, from the collected data, a statistical probability function for the exhaust gas regeneration capability as a function of time over a working day of the vehicle by adding data from the plurality of work days to each other, and
identifying, via the computer, from the probability function the time period that statistically is suitable for initializing the regeneration process; and
initiating a regeneration process during the time period of an exhaust gas system of a second vehicle, wherein the second vehicle is a different vehicle than the first vehicle.

8. Method for timing of a regeneration process of an exhaust gas system of a vehicle engine, comprising:
determining an exhaust gas regeneration capability of the vehicle engine as a function of time over a working day of the vehicle by adding data from a plurality of work days to each other from at least one of the following: exhaust gas temperature, exhaust gas mass flow, engine power, engine load, and engine torque,
determining, via a computer, how much time remains before a driver of the vehicle must take a statutory break according to relevant law,
preventing start of the regeneration process if the remaining time is considered not to be sufficient for completing the regeneration process given the determined exhaust gas regeneration capability,
determining that the remaining time is considered to be sufficient for completing the regeneration process given the determined exhaust gas regeneration capability, and
initiating the regeneration process in response to determining that the remaining time is considered to be sufficient for completing the regeneration process given the determined exhaust gas regeneration capability,
wherein the remaining time is determined to be sufficient for completing the regeneration process when, given the determined exhaust gas regeneration capability, it is probably that a regeneration will be completed.

9. Method according to claim 8, comprising determining for how long the vehicle has been in current operation.

10. A computer comprising a program for performing all the steps of a method comprising collecting, in the computer, during operation of a vehicle, data on an exhaust gas regeneration capability as a function of time for a plurality of work days, wherein the exhaust gas regeneration capability is determined from at least one of the following: exhaust gas temperature, exhaust gas mass flow, engine power, engine load, and engine torque, establishing, via the computer, from the collected data, a statistical probability function for the exhaust gas regeneration capability as a function of time over a working day of the vehicle by adding data from the plurality of work days to each other, wherein the statistical probability function comprises at least one of an average or a most probable exhaust gas regeneration capability for each one of a group of time bins with a width that covers several data points from the same day, and a statistical probability function where the probability for a successful regeneration is given as a function of time, identifying, via the computer, from the probability function, one or several time periods that statistically are suitable and/or unsuitable for carrying out a regeneration process, wherein a time period that is statistically suitable is one during which a sufficiently high exhaust gas regeneration capability is maintained for a sufficient time that it is probably that a regeneration will be completed, and initiating the regeneration process during a time period identified as being statistically suitable for carrying out the regeneration process when the program is run on the computer.

11. A computer program product comprising program code stored on a non-transitory computer readable medium for performing all steps of a method comprising collecting, in a computer, during operation of a vehicle, data on an exhaust gas regeneration capability as a function of time for a plurality of work days, wherein the exhaust gas regeneration capability is determined from at least one of the following: exhaust gas temperature, exhaust gas mass flow, engine power, engine load, and engine torque, establishing, via the computer, from the collected data, a statistical probability function for the exhaust gas regeneration capability as a function of time over a working day of the vehicle by adding data from the plurality of work days to each other, wherein the statistical probability function comprises at least one of an average or a most probable exhaust gas regeneration capability for each one of a group of time bins with a width that covers several data points from the same day, and a statistical probability function where the probability for a successful regeneration is given as a function of time, identifying, via the computer, from the probability function, one or several time periods that statistically are suitable and/or unsuitable for carrying out a regeneration process, and initiating the regeneration process during a time period identified as being statistically suitable for carrying out the regeneration process, wherein a time period that is statistically suitable is one during which a sufficiently high exhaust gas regeneration capability is maintained for a sufficient time that it is probable that a regeneration will be completed, the computer system comprising a memory configured to store a computer program for performing the method and a processor configured to run the computer program to perform the method.

12. A computer system configured for implementing a method for timing a regeneration process or for regeneration of an exhaust gas system of a vehicle engine of a vehicle, the method comprising collecting, in a computer, during operation of the vehicle, data on an exhaust gas regeneration capability as a function of time for a plurality of work days, wherein the exhaust gas regeneration capability is determined from at least one of the following: exhaust gas temperature, exhaust gas mass flow, engine power, engine load, and engine torque, establishing, via the computer, from the collected data, a statistical probability function for the exhaust gas regeneration capability as a function of time over a working day of the vehicle, the working day being one of the plurality of work days, wherein the statistical probability function comprises at least one of an average or a most probable exhaust gas regeneration capability for each one of a group of time bins with a width that covers several data points from the same day, and a statistical probability function where the probability for a successful regeneration is given as a function of time, identifying, via the computer, from the probability function, one or several time periods that statistically are suitable and/or unsuitable for carrying out a regeneration process, and initiating the regeneration process during a time period identified as being statistically suitable for carrying out the regeneration process, wherein a time period that is statistically suitable is one during which a sufficiently high exhaust gas regeneration will be completed, the computer system comprising a memory configured to store a computer program for performing the method and a processor configured to run the computer program to perform the method.

13. Method according to claim 1, wherein the statistical probability function for the exhaust gas regeneration capability is established as the function of time over the working day of the vehicle by adding data from the plurality of work days to each other so as to build up a probability function of the exhaust gas regeneration capability for a certain time of day.

* * * * *